(12) United States Patent
Finkelstein

(10) Patent No.: US 10,396,920 B2
(45) Date of Patent: Aug. 27, 2019

(54) METHODS AND SYSTEMS FOR AN IMPROVED COMMUNICATION NETWORK

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 184 days.

(21) Appl. No.: 15/650,630

(22) Filed: Jul. 14, 2017

(65) Prior Publication Data

US 2019/0020430 A1 Jan. 17, 2019

(51) Int. Cl.

| | |
|---|---|
| H04J 3/06 | (2006.01) |
| H04L 29/06 | (2006.01) |
| H04L 1/00 | (2006.01) |
| H04L 12/18 | (2006.01) |
| H04L 12/931 | (2013.01) |
| H04N 21/43 | (2011.01) |
| H04L 29/08 | (2006.01) |
| H04N 21/61 | (2011.01) |
| H04L 12/70 | (2013.01) |

(52) U.S. Cl.
CPC .......... *H04J 3/0632* (2013.01); *H04L 1/0002* (2013.01); *H04L 12/1813* (2013.01); *H04L 29/06* (2013.01); *H04L 29/06027* (2013.01); *H04L 49/206* (2013.01); *H04L 65/1069* (2013.01); *H04L 65/80* (2013.01); *H04L 67/306* (2013.01); *H04N 21/4307* (2013.01); *H04L 2012/5649* (2013.01); *H04N 21/6125* (2013.01)

(58) Field of Classification Search
CPC ................................. H04J 3/0632; H04L 29/06
See application file for complete search history.

(56) References Cited

U.S. PATENT DOCUMENTS

| | | | | |
|---|---|---|---|---|
| 6,724,804 B1 * | 4/2004 | Kegasa | .................. | H04B 1/005 375/130 |
| 2013/0332978 A1 * | 12/2013 | Rakib | ................ | H04N 21/6168 725/127 |
| 2016/0037235 A1 * | 2/2016 | Nakamura | ....... | H04N 21/23602 725/110 |

* cited by examiner

*Primary Examiner* — Zhiren Qin
(74) *Attorney, Agent, or Firm* — Eversheds Sutherland (US) LLP

(57) ABSTRACT

Embodiments of the present disclosure provide methods, systems, apparatuses, and computer program products for an improved communication network. In one embodiment, a method is provided comprising receiving, at a first device, a first signal over a first medium, the signal comprising a first portion and a second portion, and extracting by a processor a third portion of the first signal, the third portion being at least a portion of the first portion of the first signal, the third portion being intended for receipt by a second device associated with a particular user account. The method may further include combining at least a fifth portion of the first signal with the third portion of the first signal to generate a second signal, the fifth portion of the first signal being at least a portion of the second portion of the first signal and providing the second signal to the second device.

20 Claims, 9 Drawing Sheets

METHODS AND SYSTEMS FOR AN IMPROVED COMMUNICATION NETWORK

BACKGROUND

A wide variety of service providers, such as cable providers and satellite providers, may connect user devices to one or more networks such as the Internet. Traditionally deploying and maintaining such networks may be costly. Some networks require multiple amplifiers in order to provide service to a residence, while other networks may provide service only within a limited distance from a headend. However, such amplifiers may slow down the network performance and/or consume additional power and/or increase the signal to noise ratio (SNR). In turn, this may reduce the quality of service (QOS) and/or the user experience. In turn, this may also decrease revenue. Accordingly, there is a strong need in the market for systems and methods that remedy the aforementioned problems and challenges.

BRIEF DESCRIPTION OF THE DRAWINGS

Figure 1:
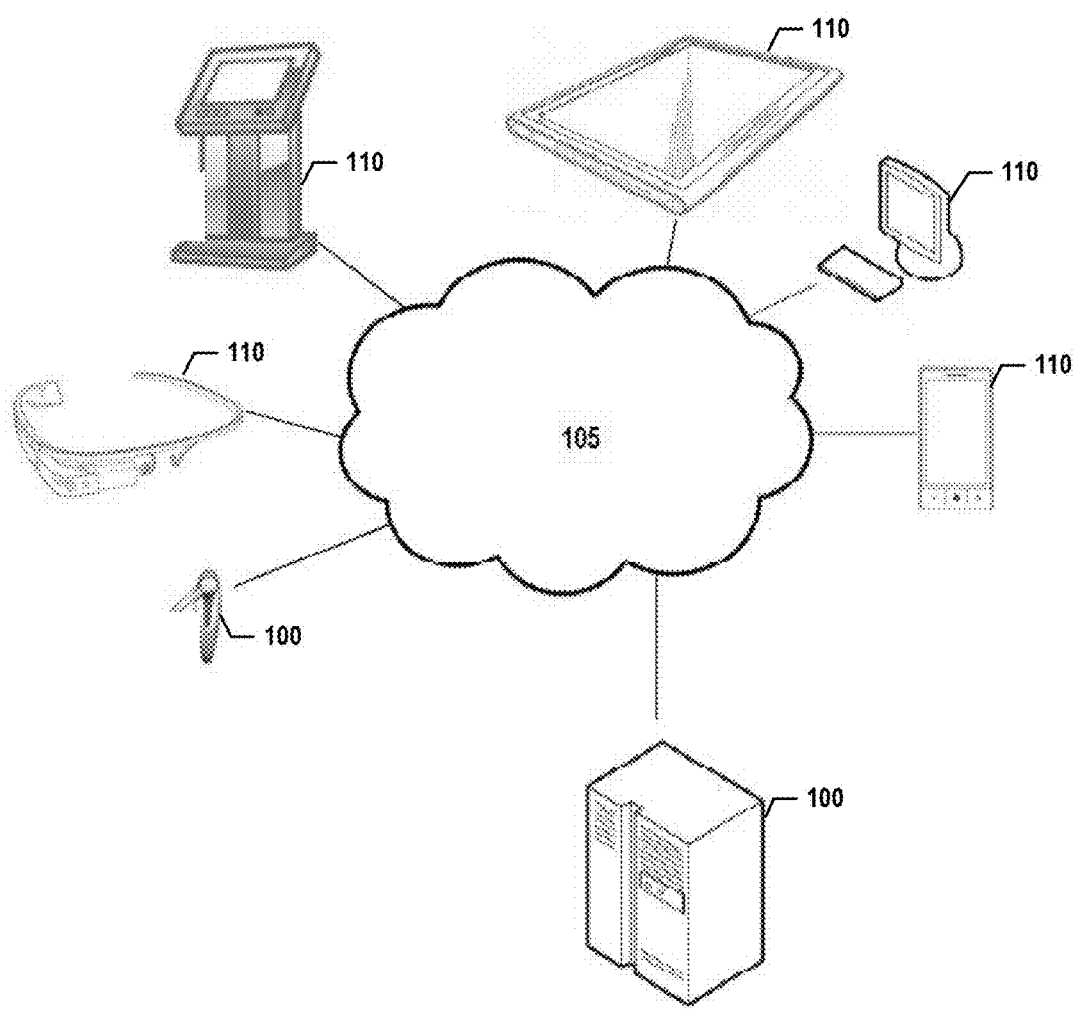

Having thus described the disclosure in general terms, reference will now be made to the accompanying drawings, which are not necessarily drawn to scale, and wherein:

FIG. 1 is an overview of a system that can be used to practice embodiments of the present disclosure.

Figure 2:
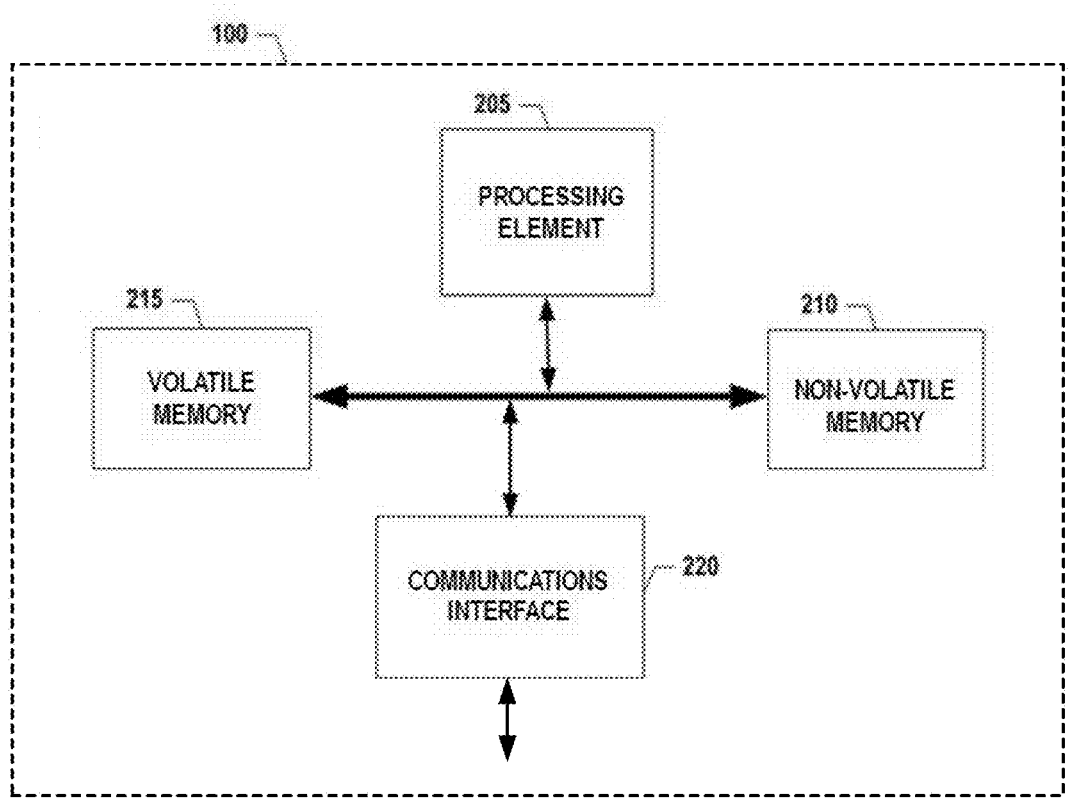

FIG. 2 is an example schematic diagram of a network computing entity according to one embodiment of the present disclosure.

Figure 3:
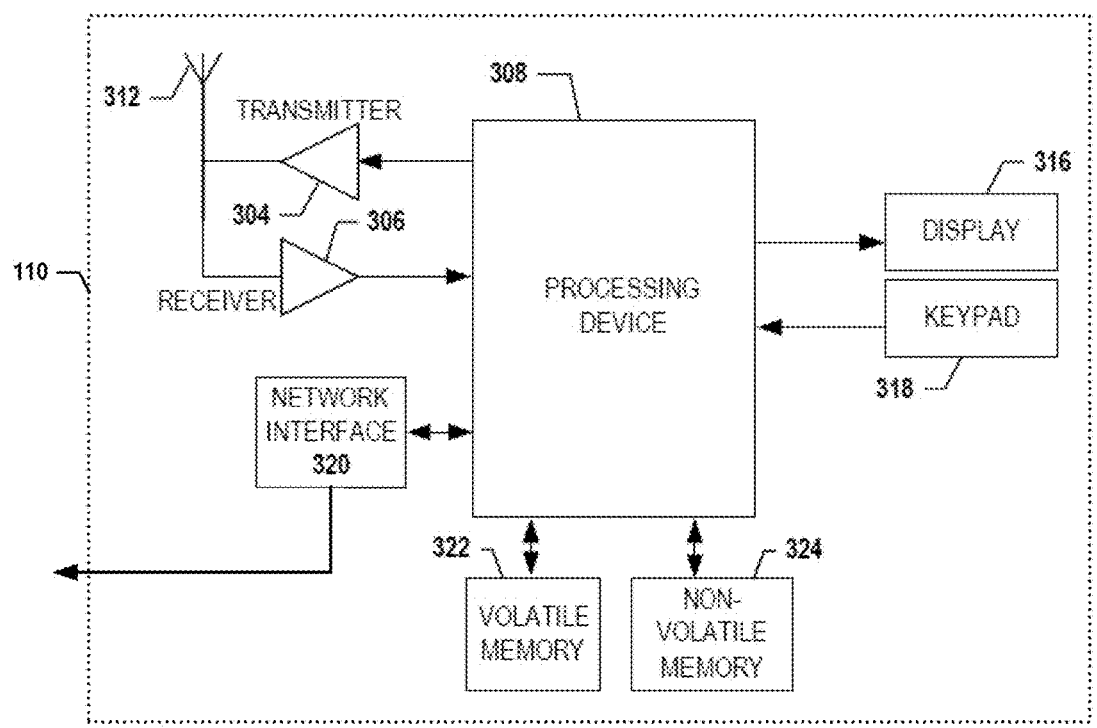

FIG. 3 is an example schematic diagram of a user device according to one embodiment of the present disclosure.

Figure 4A:
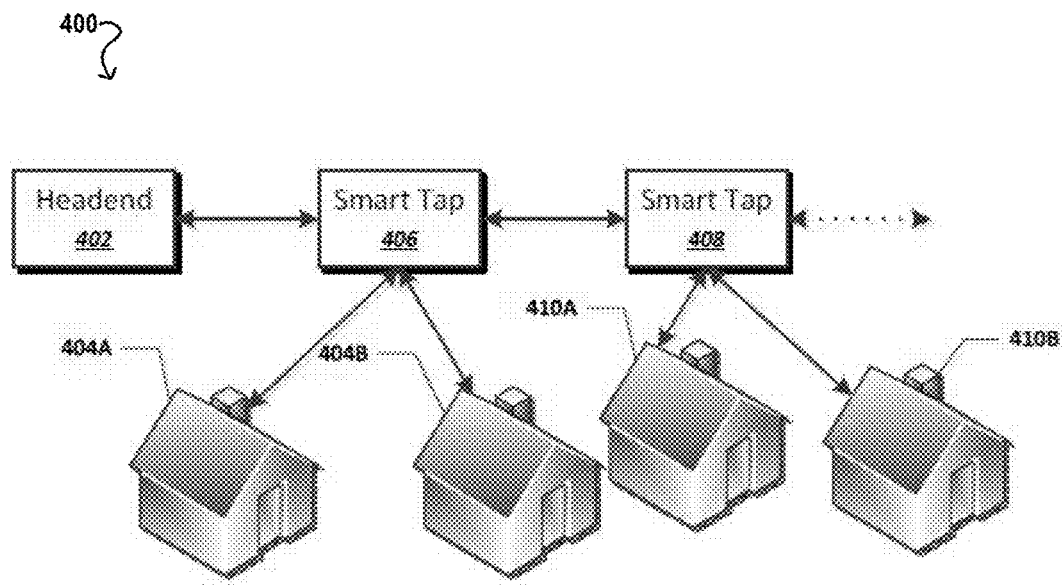
Figure 4B:
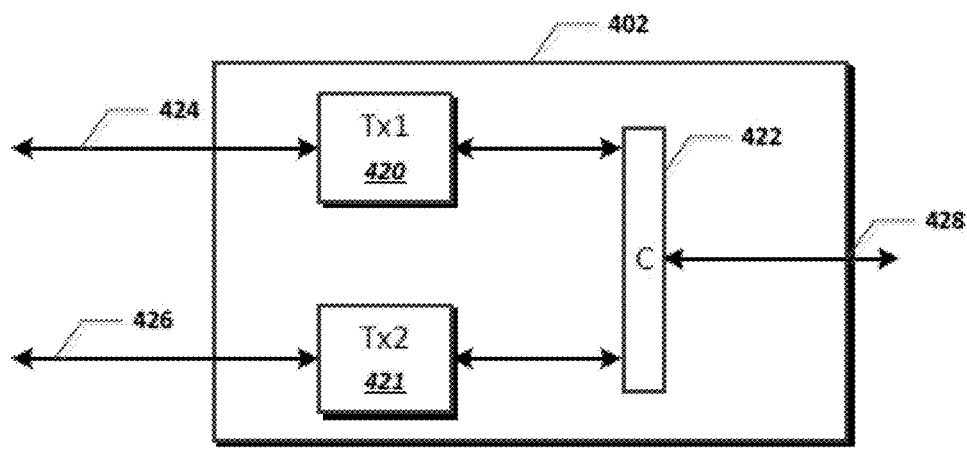

FIGS. 4A and 4B illustrate a network architecture according to various embodiments of the present disclosure.

Figure 5:
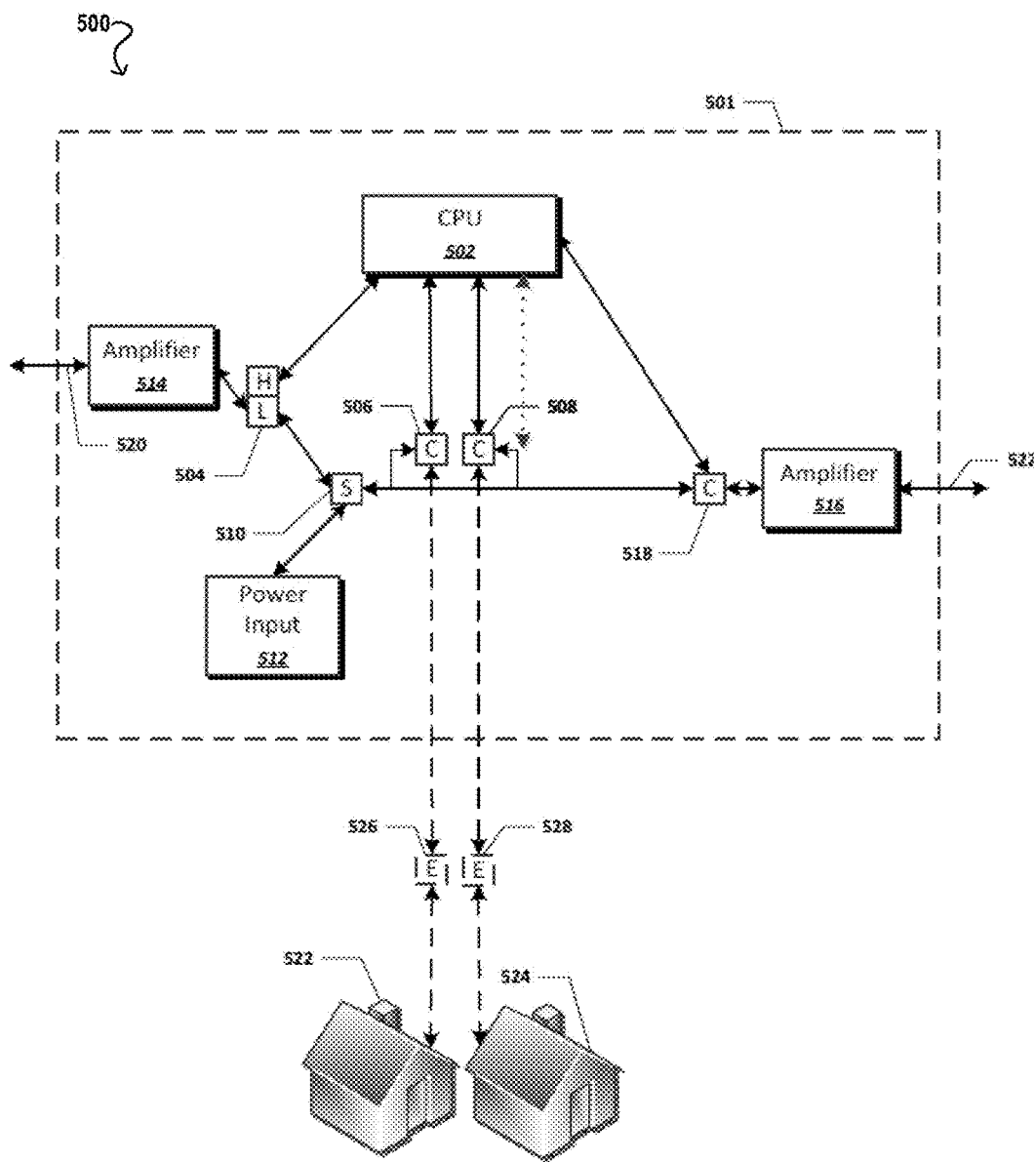
Figure 6:
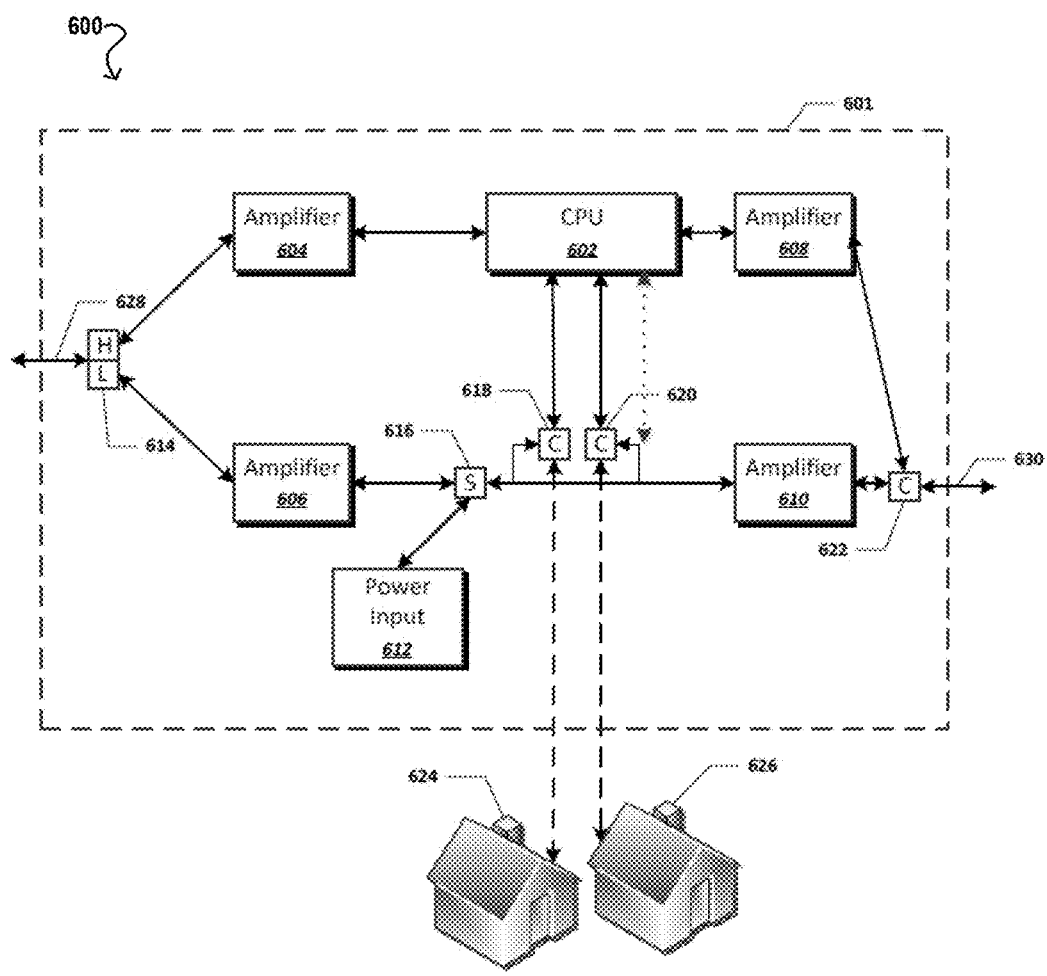

FIGS. 5 and 6 illustrate example data flows according to various embodiments of the present disclosure.

FIGS. 7A, 7B, 7C and 7D are flowcharts illustrating various procedures and operations that may be completed in accordance with various embodiments of the present disclosure.

DETAILED DESCRIPTION OF VARIOUS EMBODIMENTS

This specification relates systems to methods and systems for providing network access to one or more devices.

In general, one innovative aspect of the subject matter described herein can be embodied in methods that include the actions of receiving, at a first device, a first signal over a first medium, the signal comprising a first portion and a second portion; extracting by a processor a third portion of the first signal, the third portion being at least a portion of the first portion of the first signal, the third portion being intended for receipt by a second device associated with a particular user account; providing power to the first device using at least a fourth portion of the first signal, the fourth portion being at least a portion of the second portion of the first signal; combining at least a fifth portion of the first signal with the third portion of the first signal to generate a second signal, the fifth portion of the first signal being at least a portion of the second portion of the first signal; and providing the second signal to the second device.

Other embodiments of this aspect include corresponding systems, apparatuses, and computer programs configured to perform the actions of the methods encoded on computer storage devices.

These and other embodiments can each optionally include one or more of the following features: combining at least a sixth portion of the first signal with the fifth portion of the first signal to generate a third signal, the sixth portion being at least a portion of the first portion of the first signal, and providing the third signal to a third device different from the second device.

In general, another aspect of the subject matter described herein can be embodied in methods that include the actions of extracting by the processor a seventh portion of the first signal, the seventh portion being at least a portion of the first portion of the first signal, the seventh portion being intended for receipt by a fourth device associated with a second user account; combining at least the fifth portion of the first signal with the seventh portion of the first signal to generate a fourth signal; and providing the fourth signal to the fourth device.

Other embodiments of this aspect include corresponding systems, apparatuses, and computer programs configured to perform the actions of the methods encoded on computer storage devices.

Particular embodiments of the subject matter described herein can be implemented so as to realize one or more of the following advantages. Improve network stability, operational data transfer rates, network performance and, in turn, improve the user experience; reduce the costs associated with deploying and maintaining networks and in turn increase revenue; and extend the reach of networks to provide wider coverage and in turn enhance the user experience.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM ARCHITECTURE

FIG. 1 provides an illustration of an example embodiment of the present disclosure. As shown in FIG. 1, this particular embodiment may include one or more network computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Network Computing Entity

FIG. 2 provides a schematic of a network computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the network computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the network computing entity 100 may communicate with the user devices 110 and/or a variety of other computing entities.

As shown in FIG. 2, in one embodiment, the network computing entity 100 may include or be in communication with one or more processing elements 205 (also referred to as processors, processing circuitry, and/or similar terms used herein interchangeably) that communicate with other elements within the network computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the network computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the network computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the network computing entity 100 with the assistance of the processing element 205 and operating system.

As indicated, in one embodiment, the network computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the network computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the network computing entity 100 may include or be in communication with one or more input elements, such as a keyboard input, a mouse input, a touch screen/display input, motion input, movement input, audio input, pointing device input, joystick input, keypad input, and/or the like. The network computing entity 100 may also include or be in communication with one or more output elements (not shown), such as audio output, video output, screen/display output, motion output, movement output, and/or the like.

As will be appreciated, one or more components of the network computing entities 100 may be located remotely from other network computing entity 100 components, such as in a distributed system. Furthermore, one or more of the components may be combined and additional components performing functions described herein may be included in the network computing entity 100. Thus, the network computing entity 100 can be adapted to accommodate a variety of needs and circumstances. As will be recognized, these architectures and descriptions are provided for example purposes only and are not limiting to the various embodiments.

2. Example User Device

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the network computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. User devices 110 can be operated by various parties. As shown in FIG. 3, the user device 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and the receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the network computing entity 100. In a particular embodiment, the user device 110 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the network computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the network computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the network computing entity 100 and/or various other computing entities.

In another embodiment, the user device 110 may include one or more components or functionality that are the same or similar to those of the network computing entity 100, as described in greater detail above. As will be recognized, these architectures and descriptions are provided for example purposes only and are not limiting to the various embodiments.

III. EXAMPLE SYSTEM OPERATION

FIG. 4 depicts an example network architecture 400 providing access to the internet or a network. In the illustrated example, the architecture 400 allows complexes 404A, 404B and/or user devices 110 access to the internet or a network 105. In some implementations, complex 404A may be a house, a residential building, a business, and/or the like. Complex 404A may, for example, access audio/visual resources and informational resources through the smart tap 406 and headend 402. Online services providers may provide access to the headend 402 via a wired or a wireless online service provider network. In some implementations, the online service provider network may be a cable network that facilitates communication between the complex 404A and the headend 402. In some implementations, the online service provider network may be a wireless network that facilitates communication between the complex 404A and the headend 402 and/or other aggregators suitable for wireless networks. In some implementations, the headend 402 may be a control center in a cable system for receiving, processing and distributing signals over a cable and/or a wireless network. In some implementations, the headend 402 may be replaced with other aggregators and management devices and systems.

In turn, the headend 402 may facilitate communication between the complex 404A and the network 105. The network 105 may be, for example, the internet. In some implementations, the network 105 facilitates the access of various resources and devices. For example, the network 105 may facilitate access to audio/visual resources and/or informational resources. In one example, the user devices 110 may access audio/visual resources and/or informational resources via the network 105. Similarly, communication may be established between the user devices 110 via the network 105 and the depicted architecture 400. A plurality of user devices 110 may be connected to a local network within the complex 404A. The user devices 110 may access the network 105 according to the architecture 400.

The headend 402 may provide data to the smart tap 406 and the smart tap 408. In one example, the smart tap 406 may be in bi-directional communication with the headend 402 and/or the smart tap 408. Similarly, the smart tap 408 may be in bi-directional communication with the smart tap 406 and a third smart tap (not shown). The smart tap 406 may facilitate bi-directional communication between the complex headend 402 and the complex 404A and the complex 404B. Similarly, the smart tap 408 may facilitate bi-directional communication between the headend 402 and the complex 410A and the complex 410B. In one example, a smart tap 406 may include one or more amplifiers to ensure that the signal levels or SNR levels associated with the signal are sufficient to transfer the data to the smart tap 408 and/or the headend 402. In one example, the amplifiers may amplify the signal to have a gain having an output to input ratio of one.

FIG. 4B depicts an example headend 402 according to one or more embodiments of the invention. In the depicted example, the headend 402 may use at least two different transmission techniques. First data may be received over input 424. In one example, input 424 is a coaxial cable. The first data is then modulated and/or converted at the transmitter Tx1 420. The transmitter Tx1 420 may modulate or convert the first data into a Synchronous Digital Interface (SDI). In one example, the transmitter Tx1 420 may modulate or convert the first data into a High Definition SDI signal (HD-SDI). In one example, the transmitter Tx1 420 may be an SDI transmitter. In a different example, the transmitter Tx1 420 may be an HD-SDI transmitter. Yet in a different example, the transmitter Tx1 420 may be an HDMI transmitter. In one example, the transmitter may be a transmitter associated with a different suitable audio and/or visual transmission. Generally such transmitters may be paired with respective receivers of the same type. In one example, an HDMI transmitter may transmit uncompressed video data and/or uncompressed digital audio data. In a different example, an HDMI transmitter may transmit uncompressed video data and/or compressed digital audio data.

Second data may be received over input 426. In one example, input 426 is a coaxial cable. The first data is then modulated and/or converted at Tx2 421. In one example, the Tx2 421 may modulate or convert the second data according to a second signal different from the SDI signal. In one example, the second signal may be a legacy Data Over Cable Service Interface Specification (DOCSIS) signal. In one example, the second data may be modulated according to a full duplex Orthogonal Frequency Division Multiplexing (OFDM) scheme. For example, multiple closely spaced orthogonal s8b-carrier signals may be used to transfer or carry data on several parallel data streams. In one example, the signal produced by Tx2 421 may be associated with a frequency lower than a first threshold. For example, the first threshold may be 1 GHz. Similarly, the signal produced by Tx2 421 may be a signal associated with a frequency above a second threshold. In one example, the second threshold is 1 GHz. In a different example, the second threshold is 1.2 GHz. The signal from Tx1 420 and Tx2 421 may be combined at combined 422. For example, the signals may be added to and/or superimposed over one another. The output is then provided to the smart tap 406 as depicted in FIG. 4A. The combined signal may be provided to output 428 for transmission. In one example, the headend 402 is connected to the smart tap 406 by a coaxial cable. In one example, the coaxial cable is 150 feet long. In a different example, the coaxial cable is 100 feet long. Yet in a different example, the coaxial cable is between 100 to 150 feet long. In some examples, this architecture may provide advantages that allow the distance between the headend 402 and the smart tap 406 to increase. Similarly, the smart tap 406 may be connected to the smart tap 408 via a coaxial cable. In one example, the coaxial cable is 150 feet long. In a different example, the coaxial cable is 100 feet long. Yet in a different example, the coaxial cable is between 100 to 150 feet long. In some examples, this architecture may provide advantages that allow the distance between the smart tap 406 and the smart tap 408 to increase. Similarly, the smart tap 406 may be connected to the smart tap 408 via a coaxial cable. Additional smart taps may be connected to the smart tap 408 with parameters similar to the above.

The complexes 404A and 404B may also be connected to the smart tap via a coaxial cable. The coaxial cable may have parameters similar to the above, in some examples. In one example, each complex may include a smart demodulator for separating signals above and below a particular frequency threshold. For example, the smart demodulator may separate the signals associated with a frequency above 1 GHz from signals associated with a frequency below 1 GHz. A first demodulation scheme may be applied to the signals associated with a frequency above 1 GHz. For example, in a first scheme associated with demodulating SDI signals, HD-SDI signals may be applied to the signals associated with a frequency above 1 GHz. Similarly, a different demodulating scheme (e.g., a legacy scheme, an OFDM scheme, and/or the like) may be applied to the signals associated with a frequency below 1 GHz. In some examples, a smart demodulator may be located in the complex 404A and/or the complex 404B. For example, the smart demodulator may be located in a set-top box or a cable box. Alternatively, the smart demodulator may be located outside the complex 404A between the complex 404 A and the smart tap 406. Similar smart demodulators may be associated with complexes 404B, 410A. and 410B.

FIG. 5 depicts an environment 500 at which a smart tap 501 may operate in accordance with one or more embodiments of the disclosure. An input 520 may be provided to the smart tap 501 by a coaxial cable. A directional amplifier 514 may amplify signals flowing from the right to the left in the depicted example. Similarly, a directional amplifier 516 may amplify signals flowing from the left to the right in the depicted example. In one example, the amplifiers 514 and 516 may have a unity gain. For example, the input/output ratio may be 1:1 for the smart tap 501. The output of the amplifier 514 is provided to a high-low splitter 504. The splitter 504 may route portions of a signal based on a frequency associated with each portion. For example, the splitter 504 may route signals associated with a frequency above 1 GHz to CPU 502 and route signals associated with a frequency below 1 GHz to the splitter 510. The CPU 502 may be a networking computing entity as described above. The CPU 502 may extract from the signals associated with the above 1 GHz frequency a first signal intended for complex 522 and a second signal intended for complex 524. The signals may be extracted on control data (e.g., data headers, IP addresses, and/or the like).

The splitter 510 may route a portion of the signals associated with a frequency lower than 1 GHz to the power input 512. The portion of the signal may be used to produce power to power the smart tap 501. For example, the portion of the signal may be converted to power by one or more filters. The power may then be used to power the devices within the smart tap 501 (e.g., amplifiers). The remainder of the signals associated with a frequency below 1 GHz may then be provided to combiners 506, 508 and 518. At combiner 506, the extracted signals associated with a frequency above 1 GHz and with complex 522 may be combined with the signals associated with a frequency below 1 GHz. The output may then be provided to optional extractor E 526 shown in phantom. The optional extractor E 526 may then route the signals associated with a frequency above 1 GHz to a first demodulator employing a first demodulation scheme, and the signals associated with a frequency below 1 GHz to a second demodulator employing a second demodulation scheme. In one example, the first demodulation scheme is associated with SDI signals, and the second demodulation scheme is associated with a legacy OFDM signal. In some examples, the extractor E 526 may be located inside the complex 522. In one example, the demodulation may be done by a single smart device that includes one or more network computing entities. The network computing entity may identify that demodulated signals are associated with different frequencies according to different schemes. In one example, the smart demodulator may be located within a cable box or a set-top box.

Similarly, at combiner 508, the extracted signals associated with a frequency above 1 GHz and with the complex 524 may be combined with the signals associated with a frequency below 1 GHz. The output may then be provided to optional extractor E 528 shown in phantom. The optional extractor E 528 may then route the signals associated with a frequency above 1 GHz to a first demodulator employing a first demodulation scheme and the signals associated with a frequency below 1 GHz to a second demodulator employing a second demodulation scheme. In one example, the first demodulation scheme is associated with SDI signals and the second demodulation scheme is associated with a legacy OFDM signal. In some examples, the extractor E 528 may be located inside the complex 524. In one example, the demodulation may be done by a single smart device that includes one or more network computing entities. The network computing entity may identify that demodulated signals are associated with different frequencies according to different schemes. In one example, the smart demodulator may be located within a cable box or a set-top box. Other complexes (not shown) may be provided bi-directional communications and data access according to methods similar to the above.

At combiner 518, the output of the CPU 502, after extracting the signals for the complexes 522 and 524, is combined with the signals associated with a frequency below 1 GHz. It should be understood that the output of the CPU 502 includes signals intended for distribution to other complexes through other smart taps. Once the output of the CPU 502 is combined with the signals associated with a frequency below 1 GHz, the output is amplified by the amplifier 516. The amplifier 516 may amplify that combined signal such that the combined signal strength and/or power is substantially equal to the strength and/or power of the input signal at input 520. This amplification may ensure that the signal can travel over a coaxial cable for a desired distance. For example, this amplification may reduce the SNR and improve the QOS. The output 522 of the smart tap 501 may then be provided to a next smart tap via a coaxial cable. In one example, the amplifiers 514 and 516 are saturation amplifiers.

FIG. 6 depicts an environment 600 at which a smart tap 601 may operate in accordance with one or more embodiments of the disclosure. An input 628 may be provided to smart tap 601 by a coaxial cable. The input 628 is provided to a high-low splitter 614. The splitter 614 may route portions of the input 628 signal based on a frequency associated with each portion. For example, the splitter 614 may route signals associated with a frequency above 1 GHz to the CPU 602 and route signals associated with a frequency below 1 GHz to splitter 616. The CPU 602 may be a network computing entity as described above. The CPU may extract from the signals associated with the above 1 GHz frequency a first signal intended for complex 624 and a second signal intended for complex 626. The signals may be extracted on control data (e.g., data headers, IP addresses, and/or the like).

Directional amplifiers 604 and 606 may amplify signals flowing from the right to the left in the depicted example. Similarly, directional amplifiers 608 and 610 may amplify signals flowing from the left to the right in the depicted example. In one example, the amplifiers 604, 606, 608, and 610 may have a unity gain. For example, the input/output ratio may be 1:1 for the smart tap 601. The amplifiers 604, 606, 608, and 610 may be configured in parallel to produce an input/output ratio of 1:1.

The splitter 616 may route a portion of the signals associated with a frequency lower than 1 GHz to the power input 612. The portion of the signal may be used to produce power to power the smart tap 601. For example, the portion of the signal may be converted to power by one or more filters. The power may then be used to power the devices within the smart tap 601 (e.g., amplifiers 604-610). The remainder of the signals associated with a frequency below 1 GHz may then be provided to the combiners 618 and 620. At combiner 618, the extracted signals associated with a frequency above 1 GHz and with the complex 624 may be combined with the signals associated with a frequency below 1 GHz. The output may then be provided to an optional extractor (not shown) as described above. The optional extractor may then route the signals associated with a frequency above 1 GHz to a first demodulator employing a first demodulation scheme and the signals associated with a frequency below 1 GHz to a second demodulator employing a second demodulation scheme. In one example, the first demodulation scheme is associated with SDI signals and the second demodulation scheme is associated with a legacy OFDM signal. In the depicted example, the extractor may be located inside the complex 624. In one example, the demodulation may be done by a single smart device that includes one or more network computing entities. The network computing entity may identify that demodulated signals are associated with different frequencies according to different schemes. In one example, the smart demodulator may be located within a cable box or a set-top box.

Similarly, at combiner 620, the extracted signals associated with a frequency above 1 GHz and with the complex 626 may be combined with the signals associated with a frequency below 1 GHz. The output may then be provided to an optional extractor (not shown). The optional extractor may then route the signals associated with a frequency above 1 GHz to a first demodulator employing a first demodulation scheme and the signals associated with a frequency below 1 GHz to a second demodulator employing a second demodulation scheme. In one example, the first demodulation scheme is associated with SDI signals and the second demodulation scheme is associated with a legacy OFDM signal. In some examples, the extractor may be located inside the complex 626. In one example, the demodulation may be done by a single smart device that includes one or more network computing entities. The network computing entity may identify that demodulated signals are associated with different frequencies according to different schemes. In one example, the smart demodulator may be located within a cable box or a set-top box. Other complexes (not shown) may be provided bi-directional communications and data access according to methods similar to the above.

The output of the CPU 602, including signals intended for distribution to other complexes through other smart taps, may be amplified by directional amplifier 608 to account for losses associated with the extraction and counter such losses. Similarly, the signals associated with a frequency below 1 GHz may then be amplified by the directional amplifier 610 to achieve similar results. The amplified signals from amplifiers the 608 and 610 may then be combined at the combiner 622. The output 630 (output of the combiner and the smart tap 601) is then provided to a next tap (not shown) via one or more coaxial cables. Amplifiers 604 and 606 perform a function similar to the above when the data flow is from the right to the left in the depicted example. This amplification may ensure that the signal can travel over a coaxial cable for a desired distance. For example, this amplification may reduce the SNR and improve the QOS. The output 630 of the smart tap 601 may then be provided to a next smart tap via a coaxial cable. In one example, the amplifiers 604, 606, 608 and 610 are saturation amplifiers.

Figure 7A:
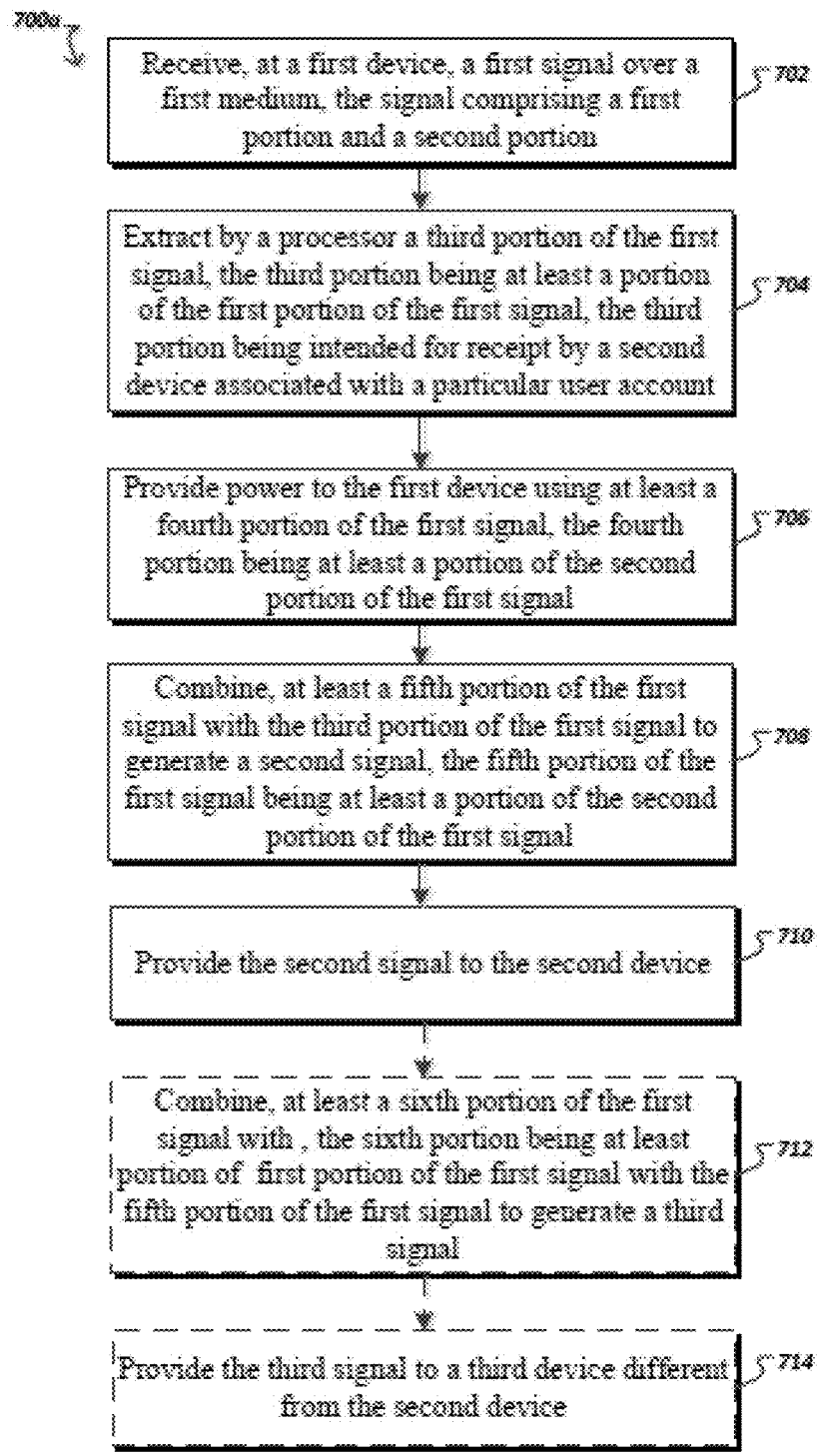
Figure 7B:
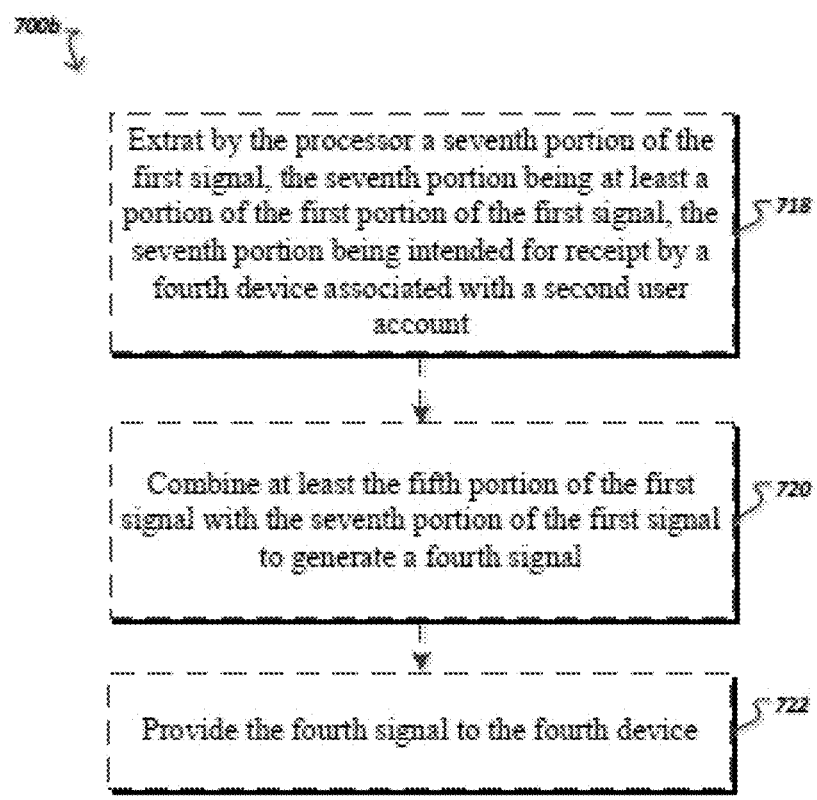

FIG. 7A is an example flowchart of a process 700a in accordance with various embodiments of the present disclosure. The process 700a begins with receiving, at a first device, a first signal over a first medium, the signal comprising a first portion and a second portion (702). For example, the smart tap 501 may receive a first signal over a coaxial cable. In one example, the first signal may include an SDI portion and a legacy and/or an OFDM portion.

The process 700a may continue with extracting by a processor a third portion of the first signal, the third portion being at least a portion of the first portion of the first signal, the third portion being intended for receipt by a second device associated with a particular user account (704). For example, a network computing entity (e.g., the CPU 502) may extract a portion of the SDI signal intended for receipt by a cable box associated with a particular customer account and/or a particular residence ID.

The process 700a may continue with providing power to the first device using at least a fourth portion of the first signal, the fourth portion being at least a portion of the second portion of the first signal (706). For example, the legacy and/or OFDM signal may be utilized to provide power to the smart tap 501, as described herein. Accordingly, the smart tap 501 may receive power from its input signals and therefore may not require an additional power connection. In turn, the process 700a may continue with combining at least a fifth portion of the first signal with the third portion of the first signal to generate a second signal, the fifth portion of the first signal being at least a portion of the second portion of the first signal (708). For example, a combiner may be used to combine at least a portion of the legacy and/or OFDM signal with the SDI signal intended for receipt by the cable box associated with the particular user account and/or particular residence ID.

In turn, the process 700a may continue with providing the second signal to the second device (710). For example, the smart tap 501 may provide the combined signal to the cable box associated with the particular user account and/or particular residence ID.

The process 700a may continue with optional step 712 shown in phantom. The process 700a may then continue with combining at least a sixth portion of the first signal with the fifth portion of the first signal to generate a third signal the sixth portion being at least a portion of the first portion of the first signal (712). For example, the output of the CPU 502 after extraction may be combined with at least a portion of the OFDM and/or legacy signal.

In one example, the combined signal may be amplified. In turn, the process 700a may continue with the optional step 714 shown in phantom. The process 700a may continue with providing the third signal to a third device different from the second device (714). For example, the combined and/or amplified signal may then be provided by the smart tap 501 to a second smart tap.

The steps of process 700*a* may optionally continue with the optional steps of process 700*b*. The process 700*b* may begin with extracting by the processor a seventh portion of the first signal, the seventh portion being at least a portion of the first portion of the first signal, the seventh portion being intended for receipt by a fourth device associated with a second user account (718). For example, the CPU 502 may extract a second portion of the SDI signal intended for a second cable box associated with a particular user account and/or residence ID.

In turn, the process 700*b* may continue with combining at least the fifth portion of the first signal with the seventh portion of the first signal to generate a fourth signal (720). For example, the process 700*b* may combine the SDI signal associated with the second cable box with at least a portion of the OFDM and/or legacy signal. Finally, the process 700*b* may provide the fourth signal to the fourth device (722). For example, the process 700*b* may provide the combined signal to the second cable box.

Figure 7C:
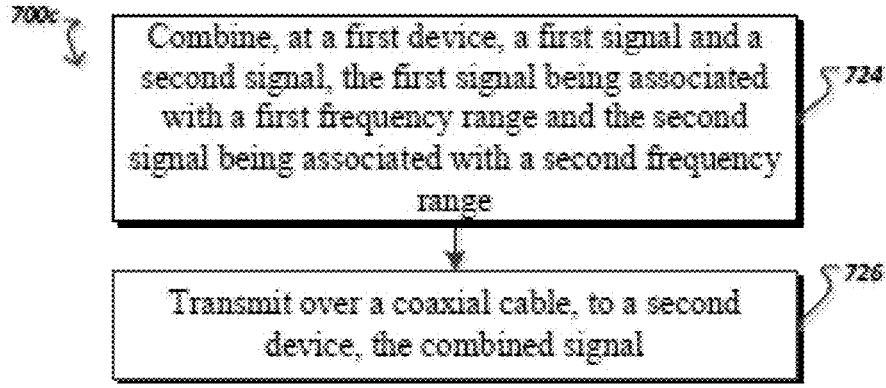

FIG. 7C is an example flowchart of an example process 700*c* in accordance with one or more embodiments of the disclosure. The process 700*c* may begin with combining, at a first device, a first signal and a second signal, the first signal being associated with a first frequency range and the second signal being associated with a second frequency range (724). For example, a transmitter device and/or a headend device may combine an SDI signal with a legacy and/or OFDM signal for transmission over a coaxial cable. In turn, the process 700*c* may transmit over a coaxial cable, to a second device, the combined signal (726). For example, the headend and/or transmitter may transmit over a coaxial cable the combined signal to the smart tap 501.

Figure 7D:
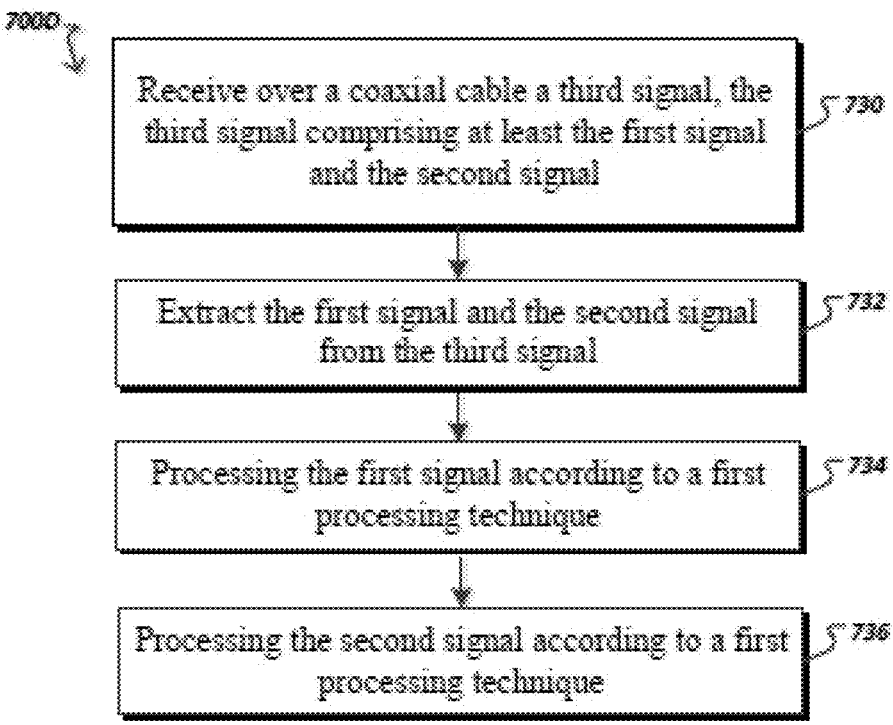

FIG. 7D is an example flowchart of an example process 700*d* in accordance with one or more embodiments of the disclosure. The process 700*d* may begin with receiving over a coaxial cable a third signal, the third signal comprising at least the first signal and the second signal (730). For example, a cable box device and/or an extractor may receive over a coaxial cable a first signal comprising an SDI signal and a legacy and/or OFDM signal. The process 700*d* may continue with extracting the first signal and the second signal from the third signal (732). For example, the process 700*d* may extract the SDI signal and the legacy and/or OFDM signal and route each signal to a different device and/or location. In one example, the process 700*d* may utilize a network computing entity to identify the SDI signal from the legacy and/or OFDM signal. In one example, the SDI signal may be identified based on a frequency rage above 1 GHz and/or above 1.2 GHz. In one example, the legacy and/or OFDM signal may be identified based on a frequency range below 1 GHz and/or below 1.2 GHz.

In turn, the process 700*d* may continue with processing the first signal according to a first processing technique (734). For example, the SDI signal may be processed according to a processing technique and/or a demodulation technique associated with SDI signals. Accordingly, data encoded on the SDI signal can be extracted. Similarly, the process 700*d* may continue with processing the second signal according to a first processing technique (736). For example, the legacy and/or OFDM signal may be processed according to a processing technique and/or a demodulation technique associated with legacy and/or OFDM signals. Accordingly, the data encoded on the legacy and/or OFDM signal can be extracted.

It should be understood that processes 700*a*, 700*b*, 700*c*, and 700*d* may combined and/or performed simultaneously to establish bi-directional communication between networks and devices according to one or more selection criteria.

In some implementations, network computing entity 100 may employ machine learning to configure gains of one or more amplifiers (e.g., 604, 606, 608, and 610) based on network performance. In one example, a machine learning algorithm may statically or dynamically adjust the gains associated with each amplifier to ensure that the smart tap devices maintain a unity gain and/or exceed a threshold level of performance.

These performance attributes and others may be computed periodically (e.g., daily, weekly, and monthly) for each route. Clustered or non-clustered attributes may be used to train a machine learning model. It should be understood that the selection of attributes or clusters of attributes for training machine learning models for optimization processes can greatly affect the respective performance. In some implementations, attributes and/or clusters of attributes are selected based on a statistical analysis associated with the optimization.

In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and excludes the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model. Yet in other implementations, the attributes may be selected by a user as described herein.

In some implementations, the optimization process above is performed according to a random forest model. The model may operate by constructing multiple decision trees at training. Each decision tree may be based on different attributes. In some implementations, the random forest model output is the mode of solutions among all the trees of the random forest. In some implementations, the random forest model is trained with historical data associated with various attributes. In some implementations, different trained models may be utilized for different locations and/or types of networks and/or complexes.

IV. ADDITIONAL IMPLEMENTATION DETAILS

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, a software application, a script, or code) can be written in any form of programming language, including compiled or interpreted languages, and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on the input of information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
receiving, at a first device, a first signal over a first medium, the first signal comprising a first portion and a second portion;
extracting by a processor a third portion of the first signal, the third portion being at least a portion of the first portion of the first signal, the third portion being intended for receipt by a second device associated with a particular user account;
providing power to the first device using at least a fourth portion of the first signal, the fourth portion being at least a portion of the second portion of the first signal;
combining at least a fifth portion of the first signal with the third portion of the first signal to generate a second signal, the fifth portion of the first signal being at least a portion of the second portion of the first signal; and
providing the second signal to the second device.

2. The method of claim 1, wherein the first portion of the first signal is associated with a first frequency range and the second portion of the first signal is associated with a second frequency range.

3. The method of claim 2, wherein the first frequency range exceeds the second frequency range.

4. The method of claim 2, wherein the first frequency range is above 1 GHz and the second frequency range is below 1 GHz.

5. The method of claim 1, wherein the first medium is a coaxial cable.

6. The method of claim 1, further comprising:
combining at least a sixth portion of the first signal with the fifth portion of the first signal to generate a third signal, the sixth portion being at least a portion of the first portion of the first signal; and
providing the third signal to a third device different from the second device.

7. The method of claim 6, further comprising amplifying, by one or more amplifiers, the third signal, prior to providing the third signal to the third device.

8. The method of claim 7, wherein the third signal is amplified such that power associated with the third signal is substantially equal to power associated with the first signal.

9. The method of claim 1, further comprising:
extracting by the processor a seventh portion of the first signal, the seventh portion being at least a portion of the first portion of the first signal, the seventh portion being intended for receipt by a fourth device associated with a second user account;
combining at least the fifth portion of the first signal with the seventh portion of the first signal to generate a fourth signal; and
providing the fourth signal to the fourth device.

10. The method of claim 6, wherein the first device is connected to the third device via a particular coaxial cable, and wherein the particular coaxial cable is sustainably 150 feet.

11. The method of claim 7, wherein the one or more amplifiers comprise at least a saturation amplifier.

12. A system comprising a first device, the first device further comprising:
a data processing apparatus;
one or more network routing devices in communication with the data processing apparatus; and
a computer memory apparatus in data communication with the data processing apparatus and storing instructions executable by the data processing apparatus and that upon such execution cause the data processing apparatus to perform operations comprising:
receiving, at the first device, a first signal over a first medium, the first signal comprising a first portion and a second portion;
extracting by the data processing apparatus a third portion of the first signal, the third portion being at least a portion of the first portion of the first signal, the third portion being intended for receipt by a second device associated with a particular user account;

providing power to the first device using at least a fourth portion of the first signal, the fourth portion being at least a portion of the second portion of the first signal;

combining at least a fifth portion of the first signal with the third portion of the first signal to generate a second signal, the fifth portion of the first signal being at least a portion of the second portion of the first signal; and providing the second signal to the second device.

13. The system of claim 12, wherein the first portion of the first signal is associated with a first frequency range and the second portion of the first signal is associated with a second frequency range.

14. The system of claim 13, wherein the first frequency range exceeds the second frequency range.

15. The system of claim 13, wherein the first frequency range is above 1 GHz and the second frequency range is below 1 GHz.

16. The system of claim 12, wherein the first medium is a coaxial cable.

17. The system of claim 12, wherein the operations further comprise:

combining at least a sixth portion of the first signal with the fifth portion of the first signal to generate a third signal, the sixth portion being at least a portion of the first portion of the first signal; and providing the third signal to a third device different from the second device.

18. The system of claim 17, further comprising one or more amplifiers that amplify the third signal, prior to providing the third signal to the third device.

19. The system of claim 18, wherein the one or more amplifiers comprise a saturation amplifier.

20. The system of claim 17, wherein the first device is connected to the third device via a particular coaxial cable, and wherein the particular coaxial cable is sustainably 150 feet.

* * * * *